United States Patent
Elhamias et al.

(10) Patent No.: US 8,292,177 B2
(45) Date of Patent: *Oct. 23, 2012

(54) OPTIMIZED NON-VOLATILE STORAGE SYSTEMS

(75) Inventors: Reuven Elhamias, Kfar-Vradim (IL); Andrew Tomlin, San Jose, CA (US); Wesley G. Brewer, Menlo Park, CA (US); Yosi Pinto, Palo Alto, CA (US); Micky Holtzman, Kfar-Vradim (IL)

(73) Assignee: SanDisk Technologies Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/047,631

(22) Filed: Mar. 14, 2011

(65) Prior Publication Data

US 2011/0167186 A1    Jul. 7, 2011

Related U.S. Application Data

(63) Continuation of application No. 12/166,533, filed on Jul. 2, 2008, now Pat. No. 7,926,720, which is a continuation of application No. 10/901,849, filed on Jul. 28, 2004, now Pat. No. 7,427,027.

(51) Int. Cl.
*G06K 7/08* (2006.01)
(52) U.S. Cl. .................... 235/451; 235/380; 235/492
(58) Field of Classification Search ............... 235/451, 235/492, 487, 380; 713/500, 600, 513
See application file for complete search history.

(56) References Cited

U.S. PATENT DOCUMENTS

| | | | |
|---|---|---|---|
| 5,260,555 A | 11/1993 | Sakamoto | |
| 5,784,599 A | 7/1998 | Elkhoury | |
| 5,838,950 A | 11/1998 | Young et al. | |
| 6,055,593 A | 4/2000 | Shaberman et al. | |

(Continued)

FOREIGN PATENT DOCUMENTS

JP    H09-081332    3/1997

(Continued)

OTHER PUBLICATIONS

Write Acceleration Technology for Digital Camera and CompactFlash, www.digitalfilm.com/pdf/WA_white_sheet.pdf, Sep. 30, 2003, 5 pages.

(Continued)

*Primary Examiner* — Edwyn Labaze
(74) *Attorney, Agent, or Firm* — Davis Wright Tremaine LLP (57) ABSTRACT

A memory card that adapts its operation according to the application to which it applied or the conditions under which it is operated. This allows the card to dynamical self optimize. In a first set of embodiments, the card uses host profiling where it will learn about the host during host-card interactions and the card's controller will optimize its algorithms accordingly. In another set of embodiments, the host and card will report to one another their capabilities for a quality of service negotiation. A further set of embodiments allows the storage device to memorize access sequences issued by the host under various predefined conditions, such as host reset or a power on boot sequence. The storage device can use this information to optimize operation for the expected commands. On deviation from an expected sequence, the device would memorize the new command sequence and save it, thus operating in a self-adaptive manner.

17 Claims, 5 Drawing Sheets

U.S. PATENT DOCUMENTS

| | | | |
|---|---|---|---|
| 6,182,162 B1 | 1/2001 | Estakhri et al. | |
| 6,327,639 B1 | 12/2001 | Asnaashari | |
| 6,381,405 B1 | 4/2002 | Yamagishi | |
| 6,385,667 B1 | 5/2002 | Estakhri et al. | |
| 6,721,854 B1 | 4/2004 | Asano et al. | |
| 6,820,148 B1 | 11/2004 | Cedar et al. | |
| 6,971,582 B2 | 12/2005 | Kim | |
| 7,107,420 B2 | 9/2006 | Boyd et al. | |
| 2002/0039325 A1 | 4/2002 | Aizawa | |
| 2002/0040412 A1 | 4/2002 | Estakhri et al. | |
| 2002/0112101 A1 | 8/2002 | Estakhri et al. | |
| 2002/0120797 A1 | 8/2002 | Fabre | |
| 2002/0169824 A1 | 11/2002 | Dettinger | |
| 2002/0194552 A1 | 12/2002 | Sassa et al. | |
| 2003/0131208 A1 | 7/2003 | Toba | |
| 2005/0086553 A1 | 4/2005 | Spencer | |
| 2005/0185463 A1 | 8/2005 | Kanamori et al. | |
| 2008/0189452 A1 * | 8/2008 | Merry et al. | 710/56 |

FOREIGN PATENT DOCUMENTS

| | | |
|---|---|---|
| JP | H09-330387 | 12/1997 |
| JP | H10-170564 | 6/1998 |
| JP | 2000-181784 | 6/2000 |
| JP | 2001-297316 | 10/2001 |
| JP | 2003036202 | 2/2003 |
| JP | 2003036205 | 2/2003 |
| WO | WO 99/45460 A | 9/1999 |

OTHER PUBLICATIONS

Communication Relating to the Results of the Partial International Search for International Application No. PCT/US2005/025983 for SanDisk Corporation mailed Jan. 17, 2006, 2 pages.

Notification of Transmittal of the International Search Report and the Written Opinion of the International Searching Authority, or the Declaration for SanDisk Corporation, Application No. PCT/US2005/025983, dated Feb. 19, 2008, 17 pages.

Communication Pursuant to Article 94(3) EPC, Application No. 05 773 779.3, dated Oct. 29, 2009, 3 pages.

Notification of Reasons for Refusal for Japanese Patent Application No. 2007-523657 dated Jun. 7, 2011, 13 pages.

Gist of the Office Action for Korean Patent Application No. 2007-7002213 dated Aug. 22, 2011, 2 pages.

Office Action for Taiwanese Application No. 094125592 dated Dec. 9, 2011, I5 pages.

Notification of Reasons for Refusal for Japanese Patent Application No. 2007-523657 dated Mar. 13, 2012, 30 pages.

Extended European Search Report for Application EP 11176847.9 mailed Nov. 9, 2011, 6 pages.

* cited by examiner

OPTIMIZED NON-VOLATILE STORAGE SYSTEMS

CROSS REFERENCE TO RELATED APPLICATIONS

This application is a continuation of U.S. application Ser. No. 12/166,533 filed on Jul. 2, 2008, which is a continuation of U.S. application Ser. No. 10/901,849 filed on Jul. 28, 2004, now U.S. Pat. No. 7,427,027, which applications are incorporated herein in their entirety by this reference.

BACKGROUND OF THE INVENTION

This invention relates, generally, to the use and structure of removable electronic circuit cards and, more specifically, to cards that optimize to conditions external to the card, such as the application for which they are used.

Various commercially available non-volatile memory cards that are becoming popular are extremely small and have different mechanical and/or electrical interfaces. Examples include the related MultiMediaCard ("MMC") and Secure Digital ("SD") memory cards that are available from SanDisk Corporation of Sunnyvale, Calif., assignee of the present application. There are other cards that conform to standards of the International Organization for Standardization ("ISO") and the International Electrotechnical Commission ("IEC"), an example that is widely implemented being known as the ISO/IEC 7816 standard.

The physical and electrical specifications for the MMC are given in "The MultiMediaCard System Specification" that is updated and published from time-to-time by the MultiMediaCard Association ("MMCA") of Cupertino, Calif. Versions 2.11 and 2.2 of that Specification, dated June 1999 and January 2000, respectively, are expressly incorporated herein by this reference. MMC products having varying storage capacity up to 64 megabytes in a single card are currently available from SanDisk Corporation, and capacities of 128 megabytes are expected to be available in the near future. These products are described in a "MultiMediaCard Product Manual," Revision 2, dated April 2000, published by SanDisk Corporation, which Manual is expressly incorporated herein by this reference. Certain aspects of the electrical operation of the MMC products are also described in co-pending patent applications of Thomas N. Toombs and Micky Holtzman, Ser. Nos. 09/185,649 and 09/186,064, both filed Nov. 4, 1998, and assigned to SanDisk Corporation. The physical card structure and a method of manufacturing it are described in U.S. Pat. No. 6,040,622, assigned to SanDisk Corporation. Both of these applications and patent are also expressly incorporated herein by this reference.

The newer SD Card is similar to the MMC card, having the same size except for an increased thickness that accommodates an additional memory chip. A primary difference between them is that the SD Card includes additional data contacts in order to enable faster data transfer between the card and a host. The other contacts of the SD Card are the same as those of the MMC card in order that sockets designed to accept the SD Card will also accept the MMC card. The electrical interface with the SD card is further made to be, for the most part, backward compatible with the MMC product described in version 2.11 of its specification referenced above, in order that few changes to the operation of the host need be made in order to accommodate both types of card. Certain aspects of the SD card are described in U.S. patent application Ser. No. 09/641,023, filed Aug. 17, 2000, which application is incorporated herein by this reference.

Cards made according to the ISO/IEC 7816 standard are of a different shape, have surface contacts in different positions, and a different electrical interface than the MMC and SD Cards. The ISO/IEC 7816 standard has the general title of "Identification cards-Integrated Circuits) Cards with Contacts," and consists of parts 1-10 that carry individual dates from 1994 through 2000. This standard, copies of which are available from the ISO/TEC in Geneva, Switzerland, is expressly incorporated herein by this reference. ISO/IEC 7816 cards are particularly useful in applications where data must be stored in a secure manner that makes it extremely difficult or impossible for the data to be read in an unauthorized manner. The small. ISO/IEC 7816 cards are commonly used in cellular telephones, among other applications.

Current storage systems are designed to work with a number of different applications, such as audio storage, still image storage and video storage, but are generally not optimized for a particular application. The different hosts use memory cards in different applications. These applications have different needs in terms of read and write performance, level of data integrity, and so on. Such systems may operate well in one application, but fail to provide acceptable performance in another application. The differentiation in the applications needs is not taken into account in the card controller.

These removable non-volatile memory cards include a memory array and a controller that performs as the memory control and the host interface function. These removable cards are plugged into different a variety of devices, such as personal data assistants (PDAs), digital camera, cell phone, etc., which access the card in different patterns. This differentiation causes the card to have less than optimal performance and capability to optimize the memory management algorithms according to the host access pattern for the various applications. Although general performance enhancements, such as caching, may help in many applications, there will still be trade offs in a general-purpose card. Alternately, there may be specific optimizations for certain applications, but these need to be engineered into the card ahead of time.

SUMMARY OF THE INVENTION

Therefore, the present invention, briefly and generally, presents a memory card that, independently of the host, adapts its operation according to the application to which it applied or the conditions under which it is operated. This allows the card to dynamically self optimize. For example, the card can either "sense" how it is being used or take information received from the host into account and optimize its operation accordingly.

In a first set of embodiments, the card uses host profiling where it will learn about the host during host-card interactions and collect information such read/write buffer transfer speed, idle times between sequential commands and other information and the card's controller will optimize its algorithms accordingly. In another set of embodiments, the host and card will report to one another their capabilities for a quality of service negotiation. Based on the negotiation, the card can adapt its operation accordingly for such things as error and defect management and power versus performance.

Another set of embodiments allow the storage device to memorize access sequences issued by the host under various predefined conditions, such as host reset or a power on boot sequence. As the sequence of host commands following these predefined conditions are usually the same, the storage device can use this information to optimize operation for the expected commands. On deviation from an expected sequence, the device would memorize the new command sequence and save it, thus operating in a self-adaptive manner. This method can be used to optimize memory cards prior to shipment by running a number of applications on the card, allowing the card to learn the corresponding patterns, and fixing the optimization prior to shipment.

In yet another set of embodiments, the controller can adapt its operation according to external operating conditions, such as temperature or power supply levels.

Additional details, features and advantages of the present invention will become apparent from the following description, which should be taken in conjunction with the accompanying drawings.

DESCRIPTION OF SPECIFIC EMBODIMENTS

Figure 1:
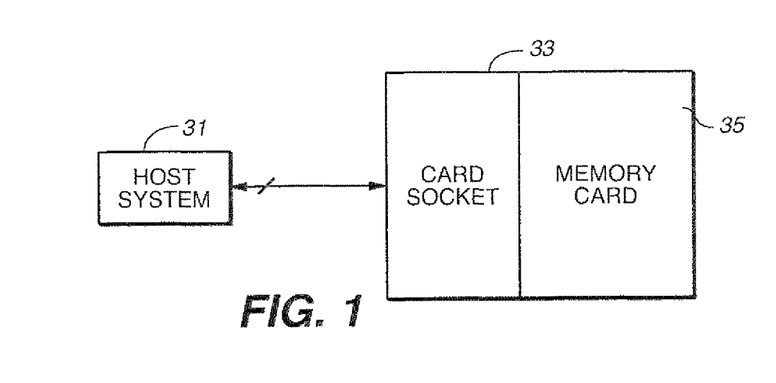
FIG. 1 illustrates a system in which a non-volatile memory card is utilized.

With reference to FIG. 1, a host electronic system 31 is illustrated to include a socket 33 into which one or more types of commercially available removable electronic circuit card 35, such as the memory cards summarized in the Background above, may be inserted and removed by the user. The socket 33 may be built into the host 31 or physically separate and connected by a cable or cableless means. The host 31 may be a personal computer, in desktop or notebook form, which includes the socket 33 that receives such a card. Other examples of host systems containing such a card socket include various portable electronic devices, such as hand held computers, personal organizers, other personal digital assistants ("PDAs"), cellular telephones, music players, and the like. Additionally, auto radios and global position system ("GPS") receivers also can have such a memory card socket. The improvements of the present invention have application to a wide variety of host systems that include a memory card socket or to which an appropriate adaptor or connector may attach a memory card.

Figure 2:
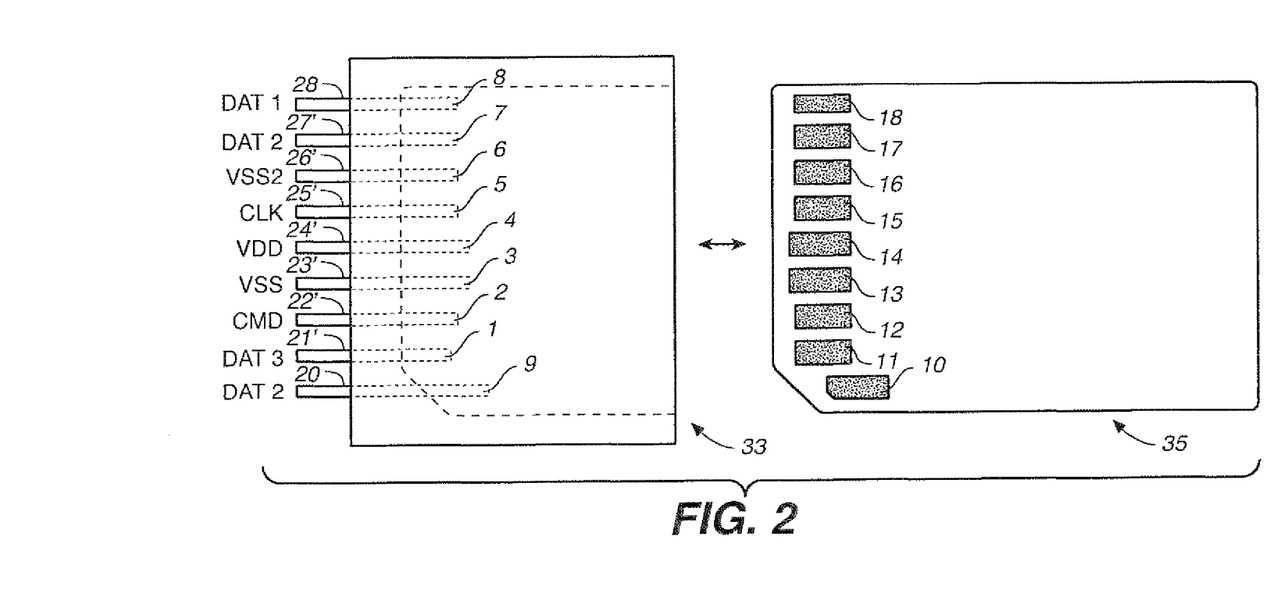
FIG. 2 shows the pin assignments of an example card and system socket in which the card is inserted.

In most of the examples described herein, the SD card is described but it will be understood that the invention is not limited to implementation with any specific type of removable electronic circuit card. In FIG. 2, the physical configuration of a SD card 35 and a mating socket 33 are shown. The SD card is rectangular in shape, having dimensions of 24 millimeters by 32 millimeters, with a thickness of 2.1 millimeters and narrow rails (not shown in FIG. 2) along the longer sides of the card that are 1.4 millimeters thick. The present invention may be implemented with a card having one of a wide variety of sizes but has a high degree of usefulness with cards that are 51 millimeters or less in length, 40 millimeters in width and 3 millimeters in thickness.

The SD card 35 contains nine surface electrical contacts 10-18. Contacts 13, 14 and 16 are connected to power ($V_{SS}$, $V_{DD}$ and $V_{SS2}$) when inserted into the host system socket 33. Card contact 15 receives a clock signal (CLK) from the host. Contact 12 receives commands (CMD) from the host and sends responses and status signals back to the host. The remaining contacts 10, 11, 17 and 18 (DAT 2, DAT 3, DAT 0 and DAT 1, respectively) receive data in parallel for storage in its non-volatile memory and send data to the host in parallel from the memory. A fewer number of data contacts are selectable for use, such as a single data contact 17. The maximum rate of data transfer between the host and the card is limited by the number of parallel data paths that are used. The MMC card described in the Background above has a similar contact layout and interface, but omits the data pins 10 and 18 and does not use the contact 11, which is provided as a spare. The MMC card has the same dimensions and operates similarly to the SD card except that the card is only 1.4 millimeters thick and has a single data contact 17. The contacts of the card 35 are connected through respective pins 20-28 of the socket 33 to its host system. Other extensions of memory cards that are compatible with the present invention are described in U.S. patent application Ser. No. 09/924,185 filed Aug. 2, 2001, which is hereby incorporated by reference.

Figure 3:
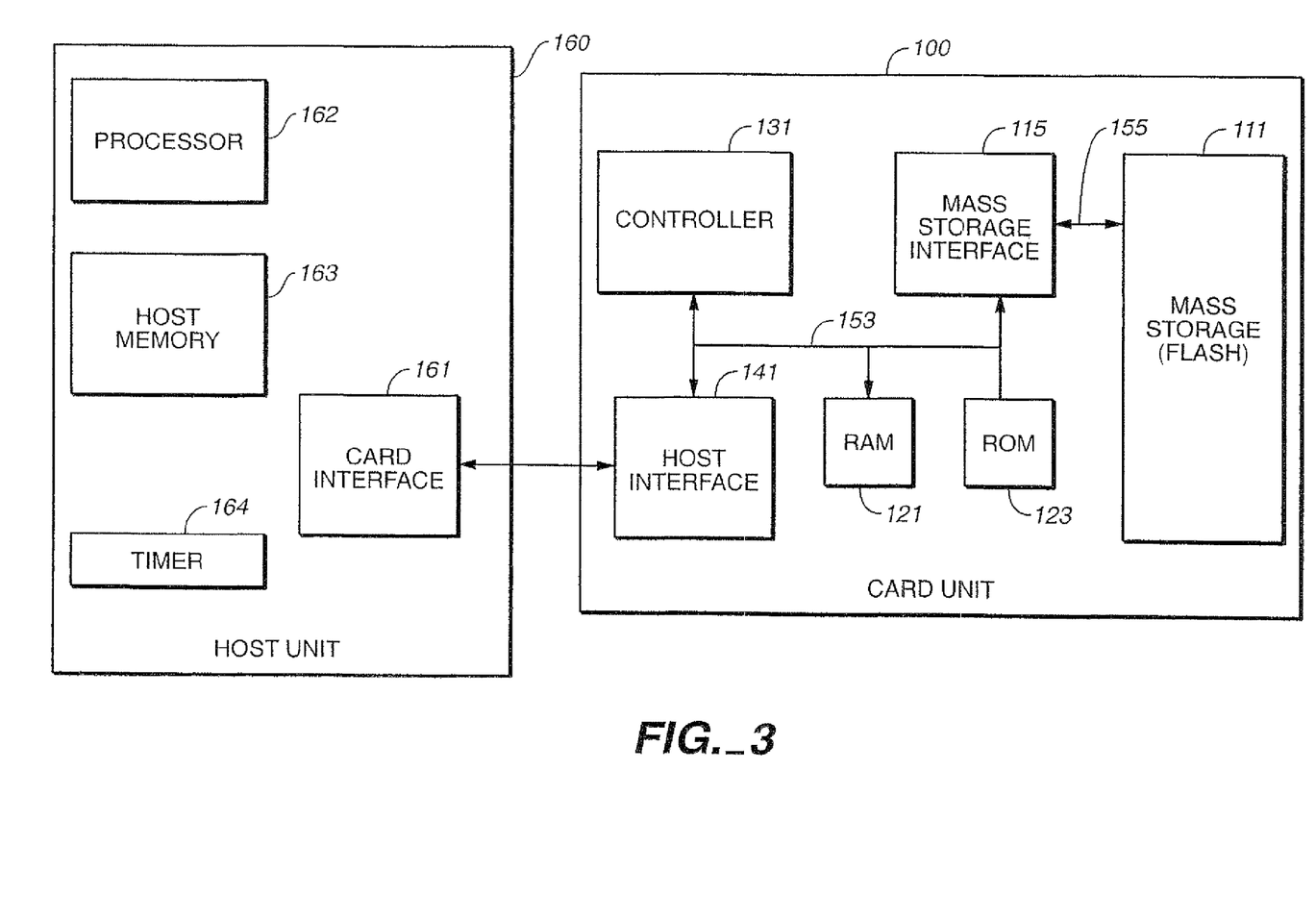
FIG. 3 is a block diagram showing more detail of an exemplary host-card system.

The exemplary embodiment of the present invention is based on removable electronic circuit card, structured such as that shown in FIG. 3. FIG. 3 shows a conventional system having data processed by the host unit and then transmitted to the PC card for storage. As shown in the figure, the system comprises two units: a host unit 160 and a card unit 100, for example a standard MultiMediaCard or SD card. Generally, the host unit can be a consumer apparatus such as a cellular phone, a PDA, a Palm Pilot, or a personal computer. The host unit 160 comprises a processor 162 and other supporting components, such as a host memory 163, a timer 164, and a number of other standard elements not shown here. Furthermore, the host unit further comprises a card interface 161 for communicating with the card unit 100. The host interface 161 can be implemented using any of the above-mentioned protocols defined by the various manufacturers or associations.

As shown in more detail in FIG. 3, the card unit 100 generally comprises a host interface 141, memory storage and, in some cases, an on-card micro-controller. For the example shown, the host interface 141 of the card unit is used for communicating with the host unit 160. The on-card microcontroller 131 is used to control the loading of data from the host unit to the memory storage. In addition, the controller is designed for handling memory functions such as addressing and buffering. The controller 131 and host interface 141 are connected to the card bus 153, to which may also be connected some non-programmable ROM memory 123 for program storage and a RAM memory 121, usually volatile, that can act as a cache, as described for example in U.S. Pat. Nos. 5,418,752 and 5,172,338, which are both hereby incorporated by this reference. The mass storage memory 111, that will be FLASH memory on a MultiMediaCard or SD card, is not connected directly to the bus 153, but is instead connected through 155 to mass storage interface 115, which is in turn connected to bus 153. The mass storage interface 115 serves as a "non-linear" or "non-random" access interface for controlling the FLASH memory where data is stored in a non-linear fashion.

Memory cards are used in a wide variety of applications storing different types of data that have different requirements. These include audio, video, digital camera, data capture, error free applications (e.g., medical data) and so on. Although current storage systems are designed in a general manner to work in a number of different applications, such as audio storage, still image storage and video storage, they may operate well in one application but fail to provide fully acceptable performance in another application.

The present invention provides for a variety of cards that may be optimized for a single application or several different applications. For example, an audio-optimized card would "sense" when it is used in an audio device, such as an MP3 player, and know that it will need to maintain a certain data rate output, but may not be required to write data often. Given such information, the controller of the card can periodically output data, and during the dead times performs housekeeping functions and/or go into low power mode. Similarly, a video-optimized card can be developed that could either "sense" it is being used in a video application or, alternatively, the host can inform the card of the fact. A video-optimized card will take other information passed from the host into account, such as: record data rate(s), play back data rate(s), format, compression, quality criteria, sound criteria and other information related to video-applications. Knowing these factors will allow the card to perform optimally for the video-application.

For example, some applications can tolerate more error than others. Such applications, such as a fax or some video applications where single pixel errors are not that noticeable, would not require completely lossless ECC. The memory device can poll the host system to determine whether such a lossy scheme is acceptable. Another example where the loss of a few bits in a sector is not critical is the playing of a coded voice that is saved on a memory card because the decoding can be compensated by the interpolation that is done on data, with each coder/decoder can define its threshold number. On the other hand, more intensive ECC can be performed in applications where data integrity is essential (e.g. medical applications). In this case, the memory device employs more complicated ECC at the cost of performance. Such variable ECC or quality of service ECC is one example of card adapting to the host. Although this may be determined based upon polling the host, the card may also adapt to the host based on the card profiling the host.

In a host profiling arrangement, the non-volatile memory system profiles the host system with which it is used in order to determine the most efficient method of communicating with the host system. The host system of the non-volatile memory system provides feedback to the card to exchange information about a number of criteria. This information could include the type of drivers installed on the host and statistics related to those types of drivers, such as whether they are for video, audio, still images, and so on. It could also include the maximum and minimum clock rates or information about the buffer in the host device (whether the host wants to use the buffer or not) or the buffer in non-volatile system (whether the host wants to use the buffer on the non-volatile system). Based upon the profile of the host established by the card, the card can optimize itself accordingly.

As an example, consider the case where the card would optimize itself based on the frequency of host reads and writes for a card used in an MP3 player. MP3 players do not write often, but they do read a lot, as opposed to cameras that write often and frequently down load to a PC or PDAs that both read and write frequently. Additionally, MP3 players read fairly regularly and not at great speed. Consequently, there is a lot of non-busy time during reads, as shown in FIG. 4.

Figure 4:
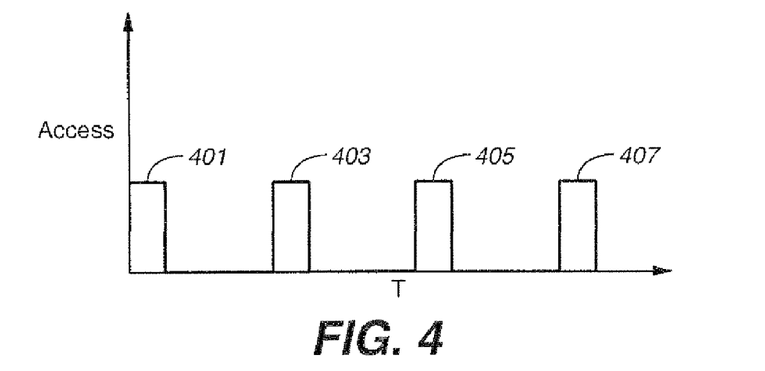
FIG. 4 illustrates an exemplary host access pattern.

FIG. 4 is a schematic representation of the access pattern of an MP3 player as a function of time, where data is read at 401, 403, 405, and so on, with the dead time between a pair of reads indicated at 411. During these dead times, the controller can go into a power saving mode, engage in defect management or various heroics to save marginal data, or fix bad bits or sectors as these non-busy times have a fairly regular occurrence and duration. Similarly, the profiling information of the host can give the card the ability to decide what are the best operations to do for the best performance of timings, quality, power consumption, and so on.

In any of these host-profiling methods, the card controller will identify the host access profile to optimize its algorithms. In addition to a memory array 111 (FIG. 3), the card will include a processor-based controller 131 that performs as the memory control. Although the memory can be based on other technologies, the exemplary embodiment will again be based on a flash memory.

As noted, these cards are designed to be plugged into different devices, such as PDAs, digital cameras, cell phones, and so on, which access the card in different patterns. In the prior art, this differentiation in function causes the card a hit in performance and in the capability to optimize the memory management algorithms according to the host access pattern as the prior art lacks the algorithm optimization aspect of the present invention. The different hosts use different applications with the memory cards. These applications have different needs in terms of read/write performance, level of data integrity, etc. that is not taken into account in the prior art card controllers. The host profiling aspect of the present invention improves upon the prior art by having two modes of operation. In the first of these, the host profiling is by the card controller. The second is based on a quality of service negotiation between the card and the host. These operations will allow the card controller to tune its algorithms according to the data collected on the host. The various embodiments can be implemented in hardware or firmware.

In the mode where the host profiling is performed by the card controller, the card will learn about the host during its transactions and will collect information, such as write/read buffer transfer speed, the idle time between data buffers, block count in read/write, LBA rewrites, file access table (FAT) updates, idle time between sequential commands, and so on. The card will then use this information to optimize the memory control algorithms to the host. For example, on a host that reads slowly, such as an MP3 player, the card can handle correctable ECC errors by having the card controller read ahead enough sectors that will allow a safe correction in the flash memory without a degradation in performance. In another example, if the card recognizes rewrites to the file access table, it can have FAT data caching in the card and update these sectors less frequently.

A first example of host profiling by the card's controller is the profiling of the clock rate used on the card's system bus, for example the SD or MMC bus as described in the references incorporated above for these cards. In this example, the card's hardware can include a counter that will be incremented on every system bus clock. Such a counter 133 is shown in FIG. 3 as part of the controller. As the system's firmware knows the system's clock rate that the controller is running, a simple calculation allows the controller to determine the bus clock. In another example, the card's firmware can activate a timer to measure how long it takes the card to receive from or send to the host a specified number of sectors. This number could be any number (2, 4, 8, 16, and so on) and can be a settable parameter in firmware.

In a further example, the card can set its system clock (or clocks) to meet the host's transfer rate and minimize power consumption. As the higher the clock rate, the greater the power consumption of the card's controller, the controller's system clock(s) have a major impact over the card's power consumption. If the card system maintains a clock rate faster than needed to conform with the host's transfer rate, unnecessary power will be consumed, so by setting the system clock settings to meet the host transfer rate, the card optimizes its power consumption while maintaining performance. The card's firmware can hold a table to indicate the card's data transfer rate for a given clock setting. Once the card's profiling has determined the host's transfer rate, it can then use the minimum clock rates that allow the card to successfully supply the host's data transfer rate. This will allow the card's power consumption to be optimized. The firmware can continue to monitor the host's data transfer rate and update the controller's clock(s) setting(s) accordingly.

In another set of examples, the card can profile a host's block count for both read and write. Again referring to the SD and MMC cards as the exemplary embodiment, the write and read commands do not have a defined block count and the termination of an operation is based on a stop transmission command. In a first instance, during a reset process, such as power on, the card's firmware can determine whether an access by the host is to the file system area instead of the user data area. At reset, the firmware can read assigned area where the Master Boot Record (MBR) is stored, such as Logical Block Address (LBA) 0. If the master boot record is a file system sector, the firmware can find the LBA range of the file system, such as (MBR+Partition Table+FAT1+FAT2) in the MMC/SD card example, where FAT1 and FAT2 are the two copies of the file access table. Once the LBA range of the file system determined, any access to this address space by the host can be considered as access to file system area and not to user area.

In a second instance, the firmware can find the block count used by the host to write data to the user space during write or read operations and the sequence of starting LBAs. Once the card's firmware has determined the block count that the host uses and the sequence of starting LBAs, it can tune its algorithms and hardware to maximize performance and minimize power consumption. Examples of such tuning can include data caching, prioritizing tasks/interrupt service routines/direct memory accesses, determine garbage collection (data relocation) preferences (such as least recently used or most recently used blocks), and so on. In systems having multiple Direct Memory Access (DMA) and Interrupt Service Routine (ISR) operations, the priority order chosen can have a major impact on performance.

In the quality of service mode, the host requests the card report its capabilities and recommendation. The host will report to the card the configuration it prefers to work with and its profile for accessing the card. The card capabilities reported to the host can include: read/write speed, best write block count, best start logical block address (LBA) alignment, ECC capabilities correct/ignore/abort, performance versus current consumption, performance versus data retention, and other operating parameters. There are usually a number of trade offs between these in card design, and this process allows these parameters to be adapted to the particular application. The host profile reported to the card can include: write/read maximum speed; logical address offsets for data types (for example, the offset in number of blocks for user data with a start LBA and block count due to overhead, such as (blocks devoted to list of transactions+start LBA+block count) or (blocks devoted to FAT area−start LBA+block count); the level of data integrity in acceptable in a read (for example, ECC errors can be corrected or can be ignored and the read continued; alternately, a bad block can be set to some pattern or the read can be aborted); and so on. All of the features described above for the host-profiling mode can also be implemented in the quality of service mode and vice versa. Additionally, it should be noted that these two modes are not exclusive of each other and be used in a complimentary manner.

As an example of the quality of service mode, if the card knows the memory area storing FATs, it can use a different algorithm to write to these FAT blocks to minimize garbage collections. In another example, if a host, such as a PC, requires high performance and has a high power supply, the card can choose a high performance/high power consumption mode, such as using multiple plane or multi-chip programming (described in U.S. patent application Ser. No. 10/315,451, filed Dec. 9, 2002, which is hereby incorporated by reference); on the other hand, in a low power host, such as an MP3 player, the card can choose low performance and low power operation.

If the controller has the ability to adjust its own internal clock frequency such as by writing a value to a defined hardware register, the controller performance can be adjusted to meet that required by the application and can even be varied depending on external conditions. For example, in a high performance application, a maximum frequency may be desirable at the expense of increased power consumption, and an intelligent controller can measure suitable external variables such as temperature or power supply voltage and adjust the clock frequency accordingly. It is common to design an internal oscillator to be relatively constant with respect to temperature and voltage. However, CMOS circuits are normally capable of higher speed operation at lower temperatures and at higher voltages. The chip temperature can be measured, such as through the use of a temperature sensitive resistor or p-n junction, and the frequency set accordingly. Similarly the external voltage is easily measured using well know analog to digital converter circuitry and the internal oscillator frequency adjusted in response to this measurement. In this manner the application can override the normally pre-set clock frequency and obtain maximum performance under a variety of application and environmental condition.

Figure 5:
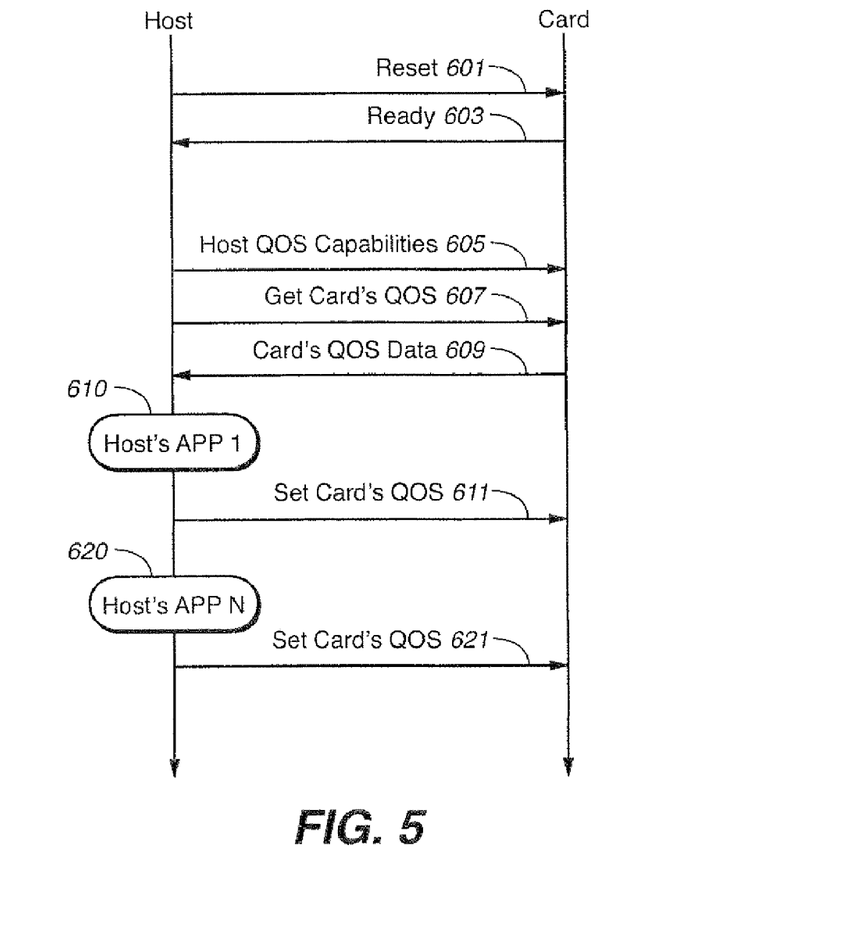
FIG. 5 describes an exemplary quality of service negotiation.

FIG. 5 is a diagrammatic illustration of an exemplary host-card quality of service negotiation process showing the exchanges that allow the card to choose the quality of service optimized for a given application. After the card is connected to a host, the host sends the card a reset signal 601. The reset signal in an MMC card embodiment is described further in U.S. patent application Ser. No. 09/186,064 incorporated above, where the ability of the card to select the host's protocol based upon the reset signal is described. The card responds with a ready signal 603. At this point the actually quality of service (QOS) negotiation begins, with the host sending its QOS capability data to the card 605 and requesting the cards QOS capabilities 607, where the order of these steps can be switched depending on the implementation. The card responds to the host with the card's QOS data 609. At this point, the host can put the card use in an application.

After the QOS negotiation between the host and the card, the host can set the card's configuration according to the host applications' needs. For instance, an MP3 application may require only require a low bit rate and low power, while an image-capture application may require the maintaining high bit rate, and so on. For example, to use the card in a first application APP 1 610, the host sets the card's QOS 611 optimized for the application: for example, it could be an application were the rate and consistency of data transfer is more important that minor amounts of error. In this ease, the use of ECC could be used only in as much as it does not affect the transfer rate. At a subsequent time, the host can use the card in another application APP N 620 and resets the card's QOS 621 accordingly: For example, application APP N could require data, such as in medical imaging, to be stored at with highest integrity with speed of far less importance.

All of these embodiments have the card learning host profile in real time and tuning the memory management algorithms according the collected information for achieving the best performance. They also differ from the prior art in that the host and card negotiate over capabilities and the card sets the card operating algorithms according to the best configuration.

Figure 6:
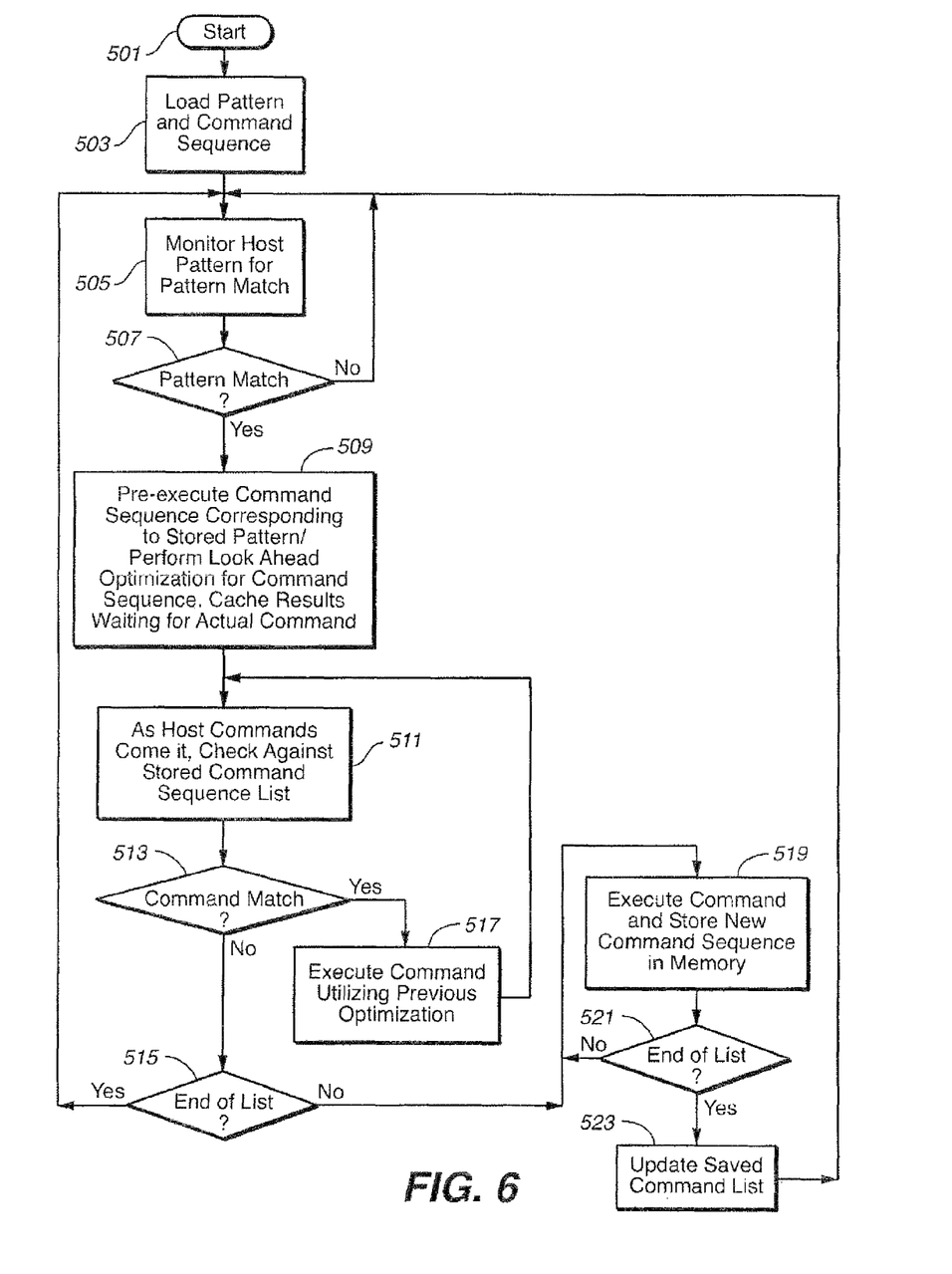
FIG. 6 is a flow chart of an exemplary embodiment.

A particular implementation of the invention based on dynamic optimization through pattern recognition is described with respect to FIG. 6. The exemplary embodiment of FIG. 6 allows the performance of storage devices to be optimized without having to analyze an overly large number of applications by allowing the storage device to dynamically self-optimize by monitoring for specific and typical patterns of host behavior. This improves upon prior art techniques, such as caching and other general performance enhancements. Although this implementation is again discussed in the context of a flash based non-volatile memory card, as are the various aspects and implementations discussed above, these concepts may be applied to other storage devices, such as in the optimization of dual storage devices such as a disk drive with flash memory device.

The techniques of the embodiment of FIG. 6 allow a storage device to memorize access sequences issued by the host under certain predefined conditions, such as host reset, power on boot sequence, various benchmarks and so on. The underlying concept is that when these predefined condition or "trigger patterns" occur, the sequence of host commands that follow them is usually identical. It should be noted that this matching is based on pattern matching, rather some sort of code matching mechanism. The storage device can use this information to optimize operation for those expected commands. Optimization could be by performing look ahead read caching to pre-fetch data, or other system type preparation that would speed up command execution. For example, when a host issues a reset, the portion of the memory storing the file access tables are most likely read first, so the card could use this as a trigger. On deviation from expected command or control sequence, the device would memorize the new command sequence and save to permanent storage thus becoming self-adaptive. Similarly, if an already stored pattern is changed, the stored pattern is updated to reflect the variation or extension of the pattern. Several different patterns and command sequences may be stored.

Referring to FIG. 6, the process starts at 501 with the card connected to the host and at step 503 any initial or additional set of patterns and command sequences are loaded onto the card. When used with a blank card, a number of such patterns may be predefined in firmware, although these need not be complete patterns. As the implementation is dynamically self-optimizing, the card itself can complete the process, thereby saving on initial engineering time. Typical patterns could include command sequences and single commands, reset, power cycle, and so on. During operation, the card will monitor the host-card interactions at step 505, seeing whether a match occurs with any of the stored patterns. This continues (the "No" loop from 507) until a match is detected at step 507, when it moves to step 509.

When a pattern matches the initial portion of a stored command sequence, the card can pre-execute the command sequence corresponding to pattern, as shown at step 509. The actual action taken may depend upon implementation and may be actions in preparation for the command or the actual execution of the command, such as a read operation to fill a cache or doing a seek to an expected location in the memory, preloading control information or tables, or performing logical to physical address translations. Controller 131 (FIG. 3) would handle the processing involved in these processes. As the host commands continue to come in, the card will check the command against the stored command sequence list (step 511) and determine (step 513) if the command previously selected as matching in step 507 based upon its initial portion continues to correspond. If so, the command will be executed in step 517 using the previous optimization. If not, nothing is lost and the process goes to step 515 where the card determines if the end of the list has been reached and, if so, to return to monitoring the host at step 505. Note that for the case where the entries of the list have an order, such a series of logical block addresses to read, it can be determined that the command does not match a list entry without having to exhaust the list.

If step 515 finds that it is not the end of the list, the flow continues to step 519 for the dynamic updating portion of the process. In step 519, the command is executed and the new sequence is stored in the memory, such as RAM 121 of FIG. 3, so that it can be saved to the command list when it is updated. It the list has not been previously exhausted, this process continues (the "No" loop from 521) until the end of the list is reached, as determined in step 521, at which point the list of saved commands is updated (step 523). For example, if the signature access of a benchmark changes so that its later portion is different than the previous value (say, switching a logical address to be read), this would be covered in the updating by revising this portion of the benchmark sequence. Once the updating is complete, the process returns to step 505 and monitors the host.

For example, consider the case where a non-volatile memory is organized into a series of "zones", such as is described in U.S. patent application Ser. No. 10/315,451 filed Dec. 9, 2002, which is hereby incorporated by reference. In this arrangement, various data used as part of the boot process, such as the file access table (FAT), is stored in a specific area, which can be taken as part of zone 0. When initially accessing a given zone, there is an initial process of logging in to that zone. For example, there may be initial header data associated with each zone that needs to be read (logical to physical conversions, remapping, etc.) and processed before the actual data content is retrieved. By performing this login ahead of time and pre-fetching any likely data, this time is saved if the sequence is as expected, and nothing is lost if it turns out to be different.

Figure 7:
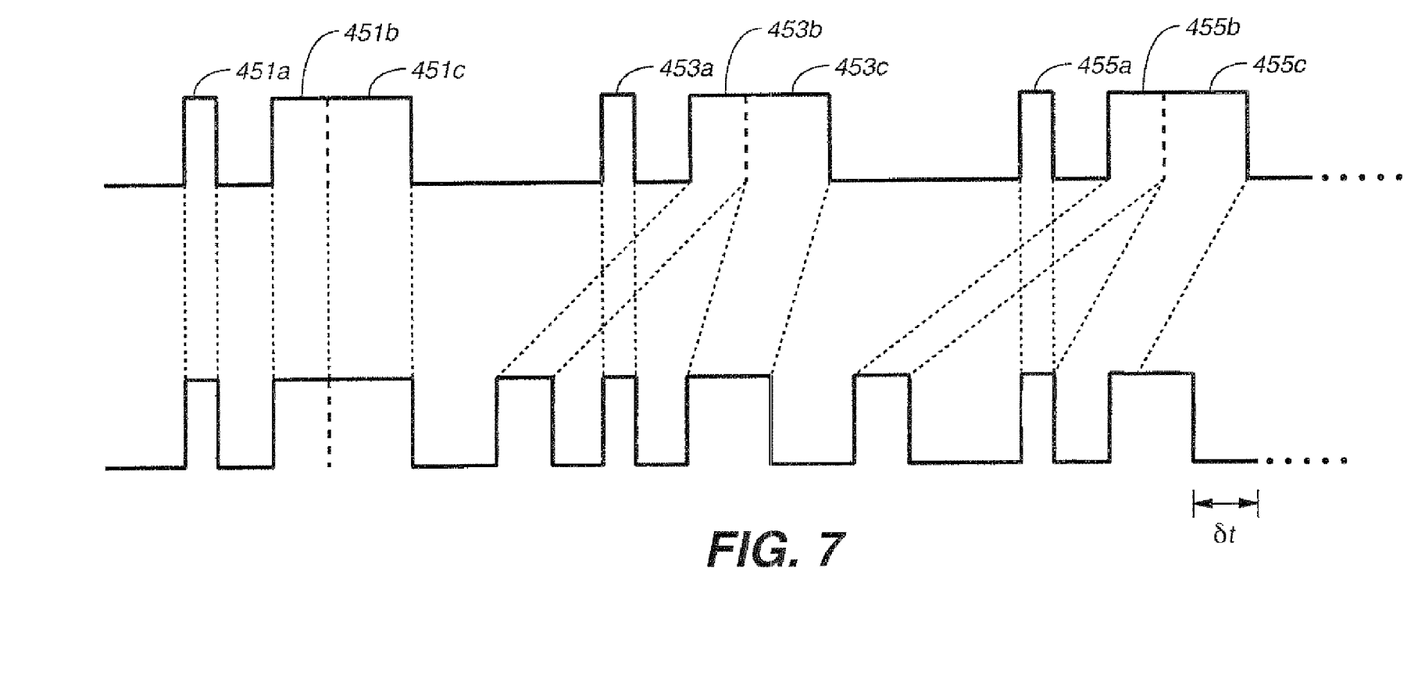
FIG. 7 illustrates an exemplary host access pattern and how access time can be reduced.

FIG. 7 can used be to illustrate this situation, where the top row illustrates the prior art process and the bottom row shows how this would be changed from the prior art. The top row of FIG. 7 is similar to FIG. 4, but with additional detail. The controller receives a command or control sequence (451*a*, 453*a*, 455*a*, . . . ) and responds. Each response consists of a corresponding preparation portion (451*b*, 453*b*, 455*b*, . . . ) and operation portion (451*c*, 453*c*, 455*c*, . . . ). In the prior art, the controller will wait for the command, such as 453*a*, before executing the corresponding preparation and operation, 453*b* and 453*c*. In the present invention, once the initial portion of the command or control sequence matches one of the trigger patterns, the subsequent preparation portions can be moved into the dead time ahead of the next command, as is shown in the bottom row of FIG. 7.

In the bottom row of FIG. 7, the controller finds a match in the control signal 451*a*. As it had not previously established this as matching a stored pattern, the corresponding preparation and operation phases (451*b*, 451*c*) are executed afterwards; however, the preparation for the expected next command (453*b*), such as caching data or a seek, is also executed prior to the arrival of the corresponding signal 453*a* at the controller. If the signal 453*a* continues to match the pattern, the preparation phase is already completed and the controller proceeds directly to the operation 453*c*. (If 453*a* is not a match, the correction preparation phase would be performed as in the top row and nothing is lost and the stored sequence can be subsequently updated) The process continues similarly for the set 455*a-c* and so on for the rest of the control sequence. This results in the hiding the preparation time for each part of the sequence after the first where the pattern is matched. For example, through 455*c* in FIG. 7, the process has the resultant time saving of at due to pre-executing the "b" portions of the commands.

For example, consider a boot process, where zone 0 is most likely to be accessed (to retrieve the FAT), followed by, say, zone 5 and then zone 1. Based on the initial portion of the sequence, during the dead time after accessing zone 0, the controller may as well login to zone 5 and be ready. If 451, 453, and 455 respectively correspond to the respective combined access times for zones 0, 5, and 1 in the exemplary process, by moving the login and pre-fetch time (453*b* in FIG. 7) into the preceding dead time, the access time needed for zone 5 is correspondingly reduced, with similar savings available in the other access times. If the sequence of commands does not go to the expected zone 5, as this login was performed during an idle time, nothing is lost. Additionally, if the boot process changes, from, say, the exemplary 0-5-1 to 0-5-3, or is extended, to, say, 0-5-1-4, this will be dynamically updated.

The dynamic optimization through pattern recognition described with respect to FIG. 6 can either be left functioning once the memory system is shipped and in the field, allowing for continued optimization during use by the consumer, or be used prior to shipping and then fixed. In the prior art, the standard method of optimizing a card at the factory for a specific application or set of applications required a study of the hosts' access patterns. Once these had been analyzed, the cards' firmware was tuned accordingly. In contrast, the present invention allows the storage device itself to learn. The storage device can start with only a few partial patterns, or no patterns, stored on the device. The card can then be run through a number of applications, such as benchmark utilities or boot sequences, and the corresponding patterns learned and stored. At this point, the learned processes could be fixed if desired and the product shipped.

Although the discussion so far has considered the adaptation of a removable electronic circuit card to host behavior, more generally the controller can adapt to the card to other external conditions. For example, it is known that the performance of flash memories, such as those found in the exemplary embodiments above, degrades when operated at extreme temperatures. Further such examples of conditions external to the memory card that may affect card operation are when the battery is low on host device. As noted above, chip temperature can be measured, such as through the use of a temperature sensitive resistor or p-n junction, and the frequency set accordingly. Similarly the external voltage is easily measured using well know analog to digital converter circuitry and the internal oscillator frequency adjusted in response to this measurement. In this manner the application can override the normally pre-set clock frequency and obtain adjust performance to a variety of external conditions.

When the controller senses any of these additional conditions that may adversely affect performance, the controller could operate the memory in a more reliable manner. This could be done in various ways similar to those already described, such as lowering performance, increased use of ECC or margining, and so on. The sensing of such conditions can be accomplished using reference cells in the memory or other techniques, such as described in U.S. Pat. No. 5,694,356, which is hereby incorporated by reference. The particular conditions to which the controller responds, and how it does so, would correspond to the memory technologies (e.g. thin film, MRAM, FRAM, NMOS, etc.) employed.

The forgoing examples memory systems have been based on flash EEPROM memory cells have been described with respect to the type of cell that utilizes conductive floating gates as charge storage elements. However, the various aspects of the present invention can be used in conjunction with the various alternate non-volatile memory technologies (such as thin film, MRAM, FRAM, NMOS, etc.) described in U.S. patent application Ser. No. 10/841,379 filed May 7, 2004, which is hereby incorporated by reference. For example, the invention may also be implemented in a system that uses a charge trapping dielectric as the storage elements in individual memory cells in place of floating gates. Dielectric storage elements are also discussed further in the U.S. patent application Ser. No. 10/280,352, filed Oct. 25, 2002, which is hereby incorporated by this reference.

Although various aspects of the present invention have been described with respect to specific embodiments, it will be understood that the invention is protected within the full scope of the appended claims.

It is claimed:

1. A method of operating a non-volatile memory-card, the card including a controller for managing the card content and the interactions between the card and a host to which it is connected according to a set of algorithms, comprising:
   monitoring a plurality of host-card interactions by the controller;
   based on said monitoring, determining characteristics of the host-card interactions; and
   using said controller to optimize at least one algorithm of said set of algorithms based on said host-card interactions.

2. The method of claim 1, wherein said characteristics comprise:
   a bus clock rate.

3. The method of claim 1, wherein said monitoring comprises:
   measuring the amount of time to transfer a specified amount of data between the card and the host.

4. The method of claim 3, wherein said characteristics comprise:
   the read and write transfer rates of the host.

5. The method of claim 1, wherein said characteristics comprise:
   the read and write block count of the host.

6. The method of claim 5, wherein said optimizing said algorithms comprises:
   based on said block count, determining whether a host access is for user data stored on the card.

7. The method of claim 5, wherein said optimizing said algorithms comprises:
   caching data based on said block count.

8. The method of claim 5, wherein said optimizing said algorithms comprises:
   setting priorities for controller operations.

9. The method of claim 5, wherein said optimizing said algorithms comprises:
   determining data relocation preferences.

10. The method of claim 1, wherein said characteristics comprise:
    the external voltage level supplied to the card.

11. The method of claim 10, wherein said optimizing said algorithms comprises:
adjusting a clock rate based on the external voltage level.

12. A method of optimizing a non-volatile memory card, the card including a controller for managing the card content and the interactions between the card and a host to which it is connected according to a set of algorithms, the method comprising:
connecting the memory card to a host;
executing a plurality of host-card interactions;
monitoring by the controller of the interactions;
using the controller to optimize at least one algorithm of said set algorithms based on said monitoring; and
fixing by the controller of said optimized set of algorithms.

13. The method of claim 12, wherein each of said interactions comprise a control sequence pattern and said monitoring includes determining one or more of said patterns.

14. The method of claim 13, further comprising:
prior to connecting the memory card to the host, pre-loading one or more control sequence patterns.

15. The method of claim 12, wherein said host-card interactions include one or more benchmark utilities.

16. The method of claim 12, wherein said host-card interactions include a boot sequence.

17. The method of claim 12, wherein said host-card interactions include a host reset.

\* \* \* \* \*